United States Patent [19]
Manickam et al.

[11] Patent Number: 6,067,384
[45] Date of Patent: May 23, 2000

[54] FAST SCALING OF JPEG IMAGES

[75] Inventors: Olagappan Manickam, Cupertino; Jonathan E. DeVito, Belmont; Radovan V. Krtolica, Los Gatos, all of Calif.

[73] Assignee: Canon Kabushiki Kaisha, Japan

[21] Appl. No.: 08/927,745

[22] Filed: Sep. 11, 1997

[51] Int. Cl.[7] ................................ G06K 9/36; G06K 9/46
[52] U.S. Cl. ......................... 382/250; 382/233; 382/299; 382/300
[58] Field of Search ...................................... 382/232, 235, 382/250, 298, 299, 300; 358/261.2, 261.3, 430, 426, 427, 432, 433, 445, 451; 348/399, 395, 403, 420

[56] References Cited

U.S. PATENT DOCUMENTS 5,708,732  1/1998  Merhav et al. ......................... 382/232

OTHER PUBLICATIONS

William B. Pennebaker and Joan L. Mitchell; "JPEG Still Image Data Compression Standard"; 1993; pp. 1–638.

*Primary Examiner*—Phuoc Tran
*Attorney, Agent, or Firm*—Fenwick & West LLP

[57] ABSTRACT

An image scaling system that enlarges images during JPEG encoding (400) and reduces images during JPEG decoding (500). The image scaling system uses N-point forward and inverse one-dimensionial scaled discrete cosine transforms (DCTs), where N is selected from among 1, 2, 3, 4, and 6. When encoding a source image (110) to an enlarged JPEG image (422), the system partitions the source image into N×N blocks. Each N×N block is transformed using the N-point scaled DCT (410). The system modifies quantization tables (418) to account for the scale of the transform and the increase in size of the image and quantizes (412) the blocks of N×N scaled cosine coefficients using the modified quantization tables. The resulting N×N blocks are enlarged (414) to 8×8 blocks by padding each block with coefficients having values of zero. When decoding a JPEG image (510) to a reduced output image (518), the system retrieves 8×8 blocks of quantized cosine coefficients from the JPEG image. The system reduces (512) each block to an N×N block of quantized cosine coefficients. The system modifies the quantization tables (520) retrieved from the JPEG image to account for the scale factor and the decrease in size of the image, then quantizes (514) the N×N blocks to produce N×N blocks of scaled cosine coefficients. The system performs an N-point scaled inverse DCT (516) on each block of scaled cosine coefficients. The results of the inverse DCT form the reduced output image (518). The forward and inverse DCTs are performed using efficient processes that require relatively few calculations to achieve the desired result.

36 Claims, 5 Drawing Sheets

FAST SCALING OF JPEG IMAGES

BACKGROUND OF THE INVENTION

1. Field of the Invention

This invention pertains in general to image processing and in particular to compressing, decompressing, and scaling images.

2. Description of Background Art

The Joint Photographic Expert Group (JPEG) standard is widely used to compress digitized gray scale and full color images. Most implementations of JPEG use "lossy" compression to achieve an increase in compression in return for a decrease in image quality. The amount of compression can be adjusted and the size of an image compressed using JPEG can be reduced by 10–15 times without noticeable loss in image quality. Accordingly, many of the stored images used in computer systems are compressed using JPEG.

However, the steps involved in compressing and decompressing a JPEG image are computationally intensive. FIG. 1 is a block diagram illustrating the functional units of a prior art JPEG encoder 100. The source image 110 is received by a discrete cosine transform (DCT) coder 112. The output of the coder 112 is provided to a quantizer 114. The output of the quantizer 114 is provided to a Huffman encoder 116. The output of the Huffman encoder 116 is stored as a JPEG image 118.

In operation, the source image 110 is divided into 8×8 blocks of pixels. The DCT coder 112 receives the 8×8 blocks and transforms each one using a forward DCT (FDCT). The FDCT produces a set of 64 DCT coefficients for each 8×8 block. The quantizer 114 quantizes each of the 64 coefficients using one of 64 corresponding values stored in a quantization table 120. The values in the quantization table are specified by the particular JPEG encoding application and may be customized to affect particular image characteristics. In addition, the quantization table is stored with the JPEG image 118 to assist in decoding. After quantization, the quantized coefficients are passed to the Huffman encoder 116. The Huffman encoder 116 uses values stored in Huffman tables 122 to compress the quantized coefficients. The Huffman encoded quantized coefficients are stored as the JPEG image 118. In addition, the Huffman tables 122 are stored in the JPEG image 118.

FIG. 2 is a block diagram illustrating a prior art JPEG decoder 200. Shown are the JPEG image 118, a Huffman decoder 210, a dequantizer 212, an inverse discrete cosine transform (IDCT) coder 214, and an output image 216. Each unit illustrated in FIG. 2 essentially performs the reverse of its corresponding unit in FIG. 1. The Huffman decoder 210 uses Huffman tables 211 extracted from the JPEG image 118 to decode the quantized DCT coefficients. The dequantizer 212 uses quantization tables 213 extracted from the JPEG image 118 to dequantize the cosine coefficients. After dequantization, the DCT coefficients are transformed into an 8×8 block of samples by the DCT coder 214. The 8×8 blocks of samples are combined into the output image 216. Complete descriptions of the JPEG encoding and decoding processes are found in William B. Pennebaker and Joan L. Mitchell, *JPEG Still Image Data Compression Standard*, Van Nostrand Reinhold, 1993, which is hereby incorporated by reference herein.

Often, there is a desire to scale the resolution of an image. Sometimes, it is desirable to display a JPEG image at a lower resolution than it is stored, such as when generating small thumbnail images from a large number of source images. Existing techniques for such scaling are inefficient in that the techniques waste processing resources. A common technique, for example, is to decode the full JPEG image and then apply a scaling algorithm to reduce the size of the decoded image. This technique, however, is processing resource inefficient because it must scale the image after it has been fully decoded. In addition, such expansion can result in spectral distortion due to image aliasing.

Similarly, it is sometimes desirable to store a JPEG image at a higher resolution than that of the source image. For example, some output devices, such as facsimile machines, accept input at only certain resolutions, such as 200 dots per inch (DPI). When compressing a source image having a smaller resolution, such as 100 DPI, that will be sent to such a device, it is desirable to increase the resolution of the resulting JPEG image. In this manner, the image produced by the output device will appear normal-sized.

A common technique for increasing resolution of an image is to JPEG encode the source image at its original resolution and then expand the image upon decoding. Such expansions, however, result in inferior image quality due to blocking artifacts.

Therefore, there is a need for a system and method of scaling JPEG images that is processing resource-efficient and does not result in image aliasing or blocking.

SUMMARY OF THE INVENTION

The above and other needs are met by an image scaling system that implements the Joint Photographics Experts Group (JPEG) image compression standard and uses 1-, 2-, 3-, 4-, and 6-point one-dimensional scaled forward and inverse discrete cosine transforms (DCTs). Through the use of these DCTs, the image scaling system can decompress JPEG images to lower resolution output images and compress source images to higher resolution JPEG images.

When encoding a source image as a higher resolution JPEG image, the scaling system (400) partitions the source image (110) into N×N blocks. Then, each N×N block is processed using a N-point scaled DCT (410), thereby producing N×N scaled cosine coefficients. Setting N to 1, 2, 3, 4, and 6 produces images that are respectively enlarged by 800%, 400%, 267%, 200%, and 133%.

Next, the scaled cosine coefficients are quantized (412) using at least one quantization table (418). The quantization table (418), however, is modified to account for the scale factor applied to the cosine coefficients during the DCT. The unmodified quantization table (418) is stored in the JPEG image (422).

The N×N blocks of quantized cosine coefficients are next converted to 8×8 blocks (414). The scaling system (400) performs this conversion by padding each dimension of the N×N blocks with 8−N zero coefficients. The scaling system (400) then encodes (416) the 8×8 blocks of quantized cosine coefficients using an encoding algorithm such as Huffman or arithmetic encoding. The encoded blocks are stored as an enlarged JPEG image (422).

When decoding a JPEG image to a lower resolution output image, the scaling system (500) first decodes the JPEG image (510) using, for example, Huffman or arithmetic decoding. his decoding (511) produces 8×8 blocks of quantized cosine coefficients. Each 8×8 block is converted (512) to an N×N block by discarding the $(8-N)^2$ highest frequency coefficients in the block. N is selected from among 1, 2, 3, 4, and 6, which respectively produces an output image that is reduced to 12.5%, 25%, 37.5%, 50%, and 75% of the original JPEG image (510) dimensions.

The quantized cosine coefficients must be re-scaled to account for the reduction in size of the output image. The necessary scale factors are folded into the quantization table extracted from the JPEG image (510), thereby producing a modified quantization table (520). The N×N blocks of quantized cosine coefficients are dequantized using the modified quantization table to produce N×N blocks of scaled cosine coefficients.

An N-point scaled inverse DCT is performed (516) on each N×N block of scaled cosine coefficients. The inverse DCT (516) produces an N×N block of the output image for each N×N block of scaled cosine coefficients processed. These N×N blocks of the output image are assembled to form a reduced output image (518).

As discussed above, encoding a JPEG image requires an N-point scaled forward DCT while decoding a JPEG image requires an N-point scaled inverse DCT. To this end, the scaling system performs efficient 1, 2, 3, 4, and 6-point one dimensional scaled forward and inverse DCTs. The 1-point forward and inverse DCTs are one step processes and require no additions or multiplications. The 2-point forward and inverse DCTs are one step processes and require two additions and no multiplication. The 3-point forward and inverse DCTs are two step processes and require one shift operation and four additions. The 4-point forward and inverse DCTs are four step processes and require one multiplication and nine additions. Finally, the 6-point forward and inverse DCTs are four step processes and require one multiplication, two shift operations, and 16 additions.

DETAILED DESCRIPTION OF THE PREFERRED EMBODIMENTS

Figure 1:
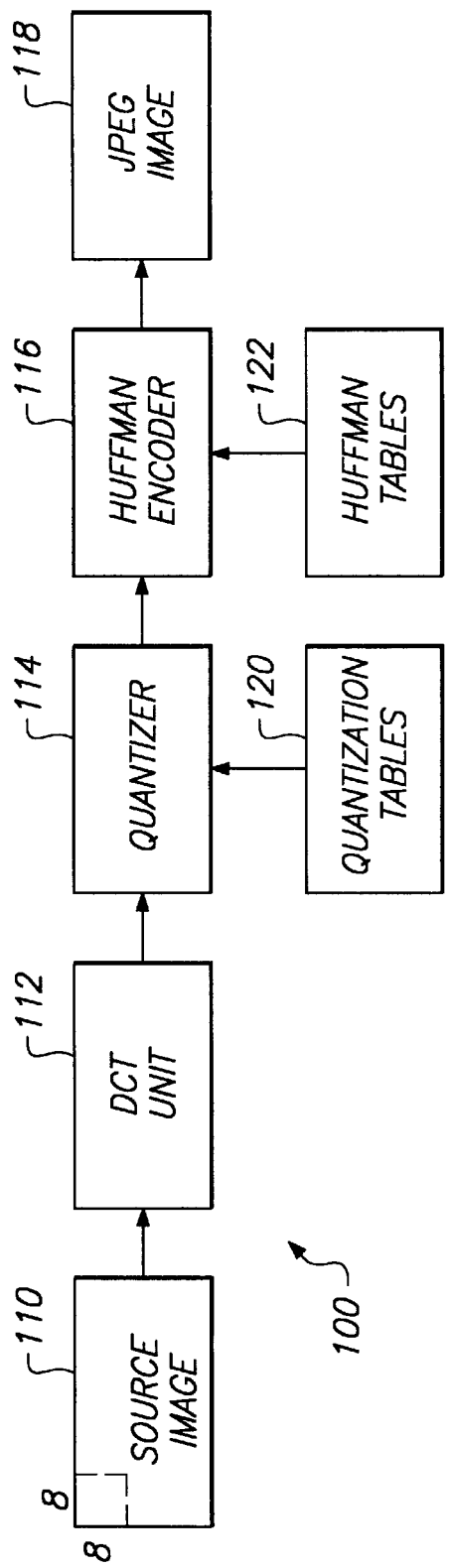
FIG. 1 is a high-level block diagram illustrating a prior art JPEG encoder.
Figure 2:
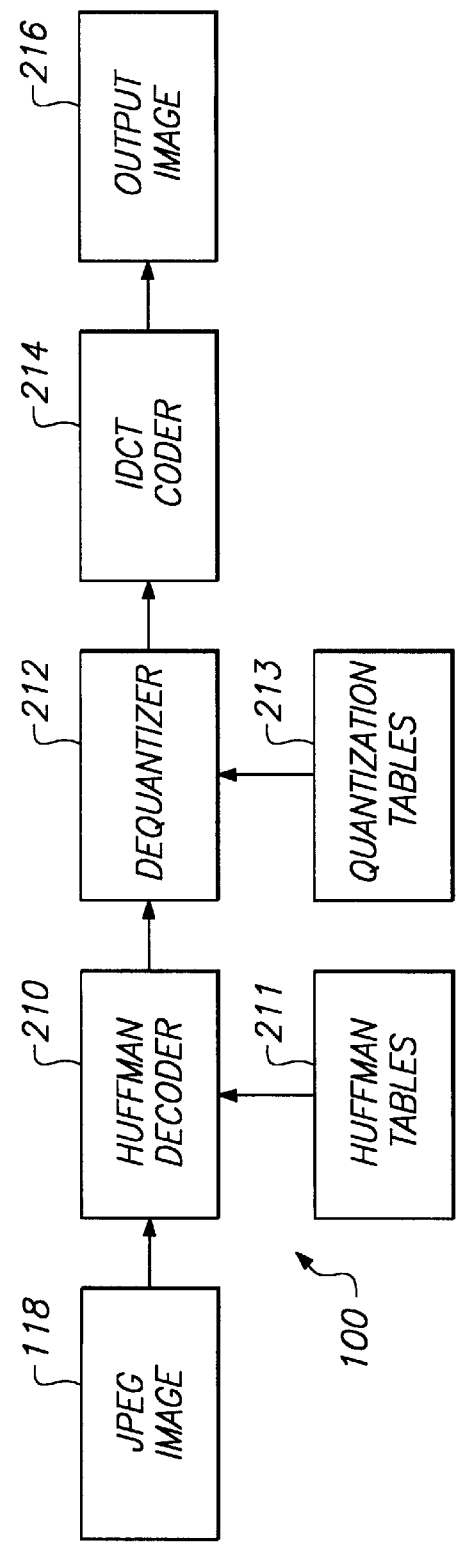
FIG. 2 is a high-level block diagram illustrating a prior art JPEG decoder.
Figure 3:
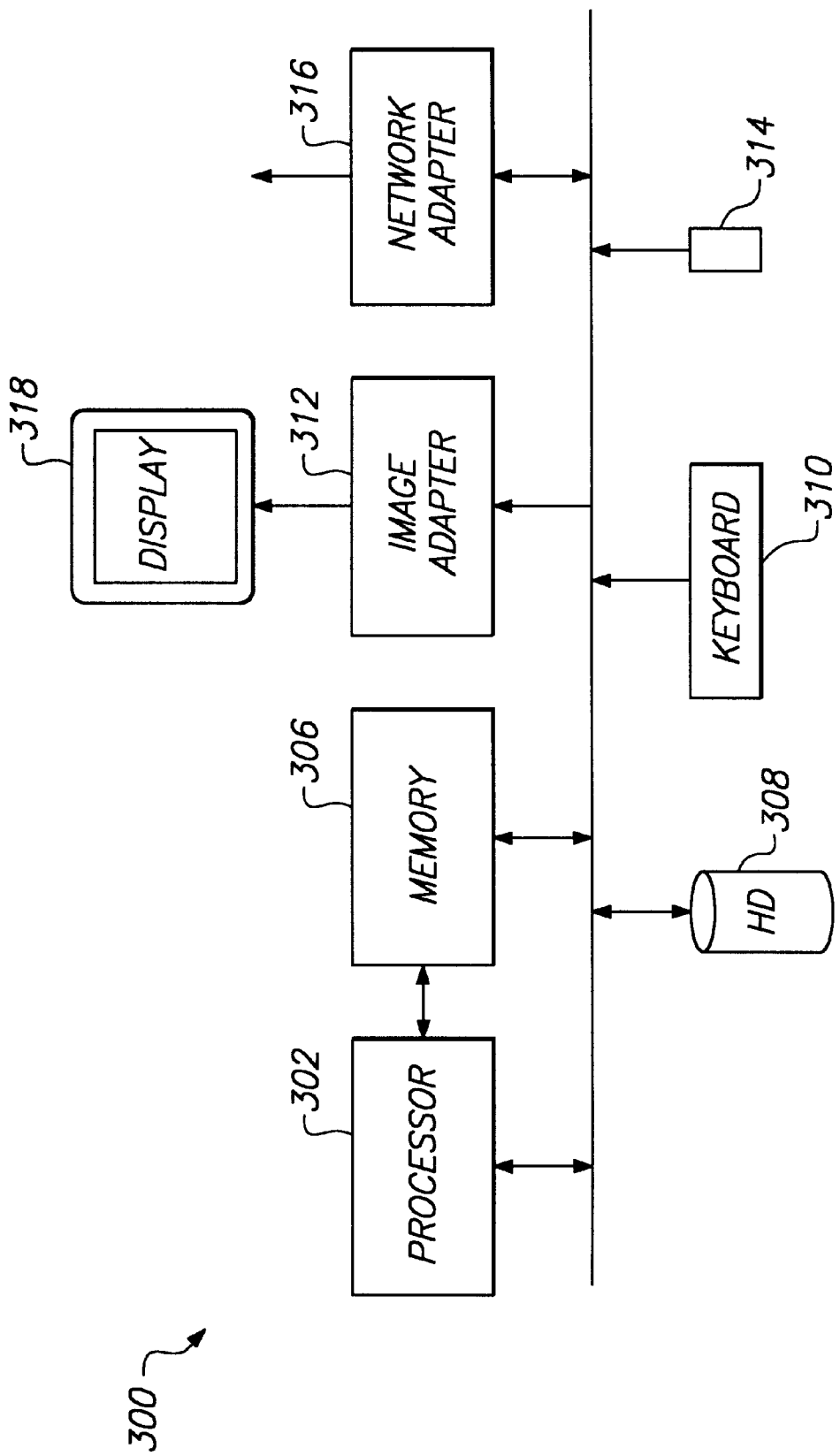
FIG. 3 is a high-level block diagram illustrating a computer system adapted to execute an image scaling system.

FIG. 3 is a high-level block diagram illustrating a computer system 300 adapted to execute an image scaling system according to the present invention. Illustrated are a processor 302 coupled to a bus 304. Also coupled to the bus are a memory 306, a storage device 308, a keyboard 310, an image adapter 312, a pointing device 314, and a network adapter 316. A display 318 is coupled to the image adapter 312.

The processor 302 may be any general-purpose processor such as a INTEL x86 compatible central processing unit (CPU). The permanent storage device 308 may be any device capable of holding large amounts of data, such as a fixed disk hard drive, compact disk read-only memory (CD-ROM), digital versatile disk (DVD), or other form of removable storage device. The memory 306 holds instructions and data used by the processor 302. The keyboard 310 and pointing device 314 may be used by a user to input data into the computer system 300. The image adapter 312 can display images and other information on the display 318. The network adapter 316 couples the computer system to a local or wide area network. A program adapted to perform image scaling according to the present invention is preferably stored in the storage device 308 and executed on the processor 302 from memory 306.

Figure 4:
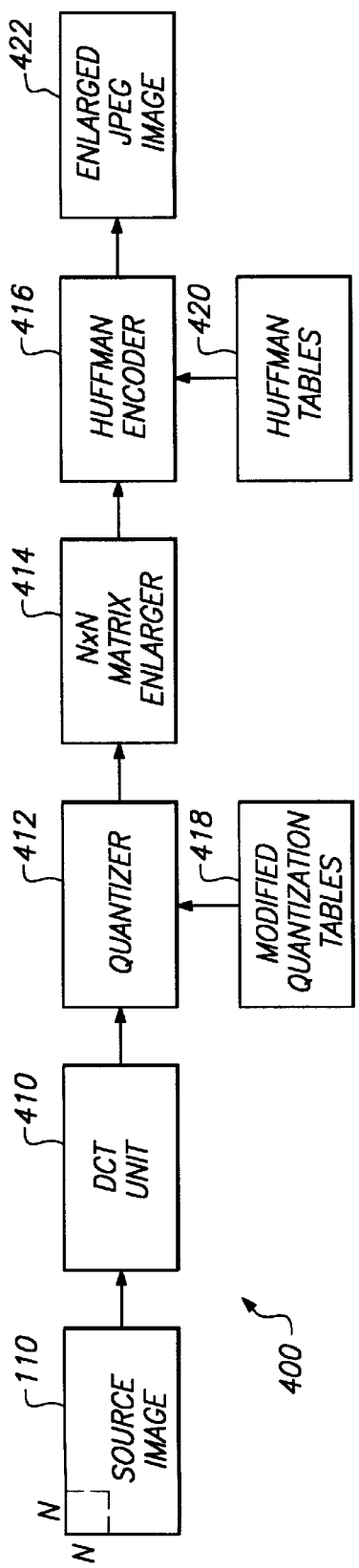
FIG. 4 is a high-level block diagram illustrating; a JPEG encoder for enlarging a source image during JPEG compression.
Figure 5:
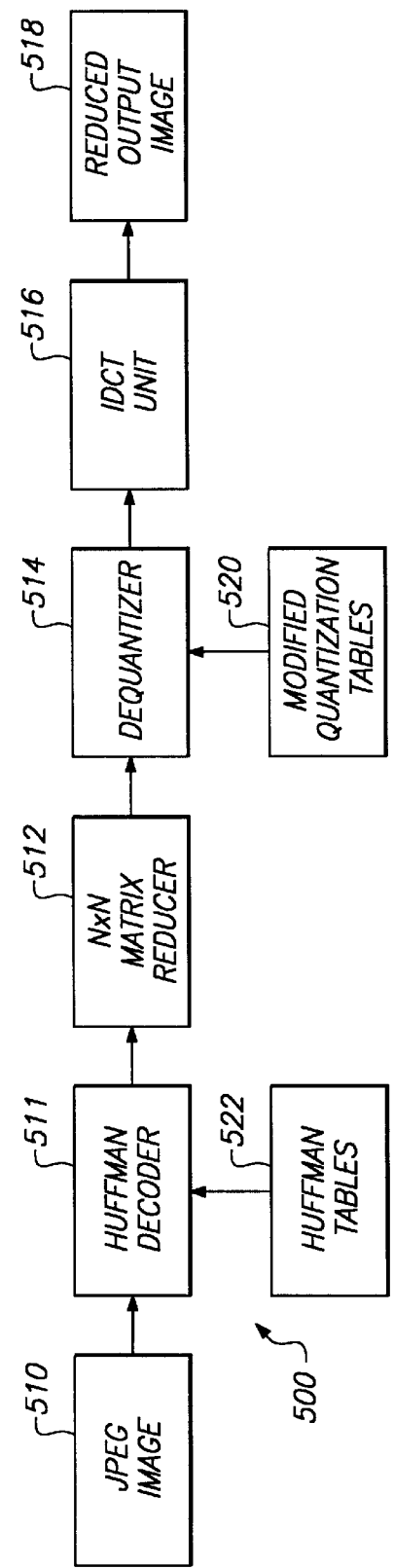
FIG. 5 is a high-level block diagram illustrating a JPEG decoder for decompressing a JPEG image to a lower resolution output image.

FIG. 4 illustrates a block diagram of a Joint Photographics Experts Group (JPEG) encoder 400 for enlarging, i.e., increasing the resolution of, a source image 110 during JPEG compression. Shown are a an N-point scaled discrete cosine transform (DCT) unit 410, a quantizer 412, an N×N matrix enlarger 414, and a Huffman encoder 416. The quantizer 412 receives input from quantization tables 418 and the Huffman encoder receives input from Huffman tables 420. Although FIGS. 4–5 are block diagrams respectively illustrating a JPEG encoder 400 and decoder 500, the block diagrams can also be interpreted as flow charts illustrating method steps for respectively performing JPEG encoding and decoding.

The source image is partitioned into N×N blocks of pixels, where N is 1, 2, 3, 4, or 6. Setting N to 1, 2, 3, 4, or 6 produces JPEG images that are respectively enlarged by 800%, 400%, 267%, 200%, and 133%. The N-point scaled DCT unit 410 receives the N×N blocks and performs an N-point two-dimensional scaled DCT on each N×N block. For each N×N block of the source image processed, the N-point scaled DCT unit 410 generates an N×N block of scaled coefficients. The operation of the DCT unit 410 is described in more detail with respect to FIGS. 6–15.

The blocks of scaled coefficients are provided to the quantizer 412. The quantizer 412 has several quantization tables 418 each holding a set of quantization values. The quantizer 412 selects a particular quantization table dependent upon the type of image data being quantized. For example, a particular table may be selected based upon whether the received coefficients correspond to a luminance or chrominance component of the source image.

Since the coefficients produced by the N-point scaled DCT unit 410 are sealed, the quantization tables 418 used by the quantizer 412 are modified to account for the scale factors and the increase in size of the image. In addition, the quantization tables are modified to account for the increased size of the JPEG image 422. Table 1 illustrates a preferred unmodified 8×8 quantization table used for JPEG compression.

TABLE 1

| $F_{ij}$ | i = 1 | 2 | 3 | 4 | 5 | 6 | 7 | 8 |
|---|---|---|---|---|---|---|---|---|
| j = 1 | 16 | 11 | 10 | 16 | 24 | 40 | 51 | 61 |
| 2 | 12 | 12 | 14 | 19 | 26 | 58 | 60 | 55 |
| 3 | 14 | 13 | 16 | 24 | 40 | 57 | 69 | 56 |
| 4 | 14 | 17 | 22 | 29 | 51 | 87 | 80 | 62 |
| 5 | 18 | 22 | 37 | 56 | 68 | 109 | 103 | 77 |
| 6 | 24 | 35 | 55 | 64 | 81 | 104 | 113 | 92 |
| 7 | 49 | 64 | 78 | 87 | 103 | 121 | 120 | 101 |
| 8 | 72 | 92 | 95 | 98 | 112 | 100 | 103 | 99 |

A modified quantization table is produced by multiplying each of the first N×N elements of the 8×8 quantization table of Table 1 with the corresponding element of the table $S_{ij}$ generated by the following formula:

$$S_{ij} = \frac{4}{N^2} D_i D_j \sec\left(\frac{i\pi}{2N}\right) \sec\left(\frac{j\pi}{2N}\right)$$

$$\text{where } D_k = \begin{cases} \sqrt{2} & \text{if } k = 0 \\ 1 & \text{if } k \neq 0. \end{cases}$$

For example, Table 2 shows a table generated using the above formula when N=6.

TABLE 2

| $S_{ij}$ | i = 1 | 2 | 3 | 4 | 5 | 6 |
|---|---|---|---|---|---|---|
| j = 1 | 4.5000 | 6.1471 | 5.5114 | 4.5000 | 3.1820 | 1.6471 |
| 2 | 6.1471 | 8.3971 | 7.5286 | 6.1471 | 4.3467 | 2.2500 |
| 3 | 5.5114 | 7.5286 | 6.7500 | 5.5114 | 3.8971 | 2.0173 |
| 4 | 4.5000 | 6.1471 | 5.5114 | 4.5000 | 3.1820 | 1.6471 |
| 5 | 3.1820 | 4.3467 | 3.8971 | 3.1820 | 2.2500 | 1.1647 |
| 6 | 1.6471 | 2.2500 | 2.0173 | 1.6471 | 1.1647 | 0.6029 |

A modified N×N quantization table for JPEG compression is created by multiplying the corresponding elements, $F_{ij}$, of the unmodified 8×8 quantization table with the N×N table, $S_{ij}$, generated with the above formula. For example, Table 3 shows a modified N×N quantization table, $Q_{ij}$ created from Tables 1 and 2.

TABLE 3

| $Q_{ij}$ | i = 1 | 2 | 3 | 4 | 5 | 6 |
|---|---|---|---|---|---|---|
| j = 1 | 72.0000 | 67.6183 | 55.1135 | 72.0000 | 76.3675 | 65.8846 |
| 2 | 73.7654 | 100.7654 | 105.4011 | 116.7952 | 113.0133 | 130.5000 |
| 3 | 77.1589 | 97.8724 | 108.0000 | 132.2724 | 155.8846 | 114.9858 |
| 4 | 63.0000 | 104.5009 | 121.2497 | 130.5000 | 162.2810 | 143.2989 |
| 5 | 57.2756 | 95.6267 | 144.1932 | 178.1909 | 153.0000 | 126.9507 |
| 6 | 39.5307 | 78.7500 | 110.9512 | 105.4153 | 94.3395 | 62.7001 |

The quantizer 412 quantizes the scaled cosine coefficients using the modified quantization tables 418. The unmodified 8×8 quantization tables are saved within the JPEG image 422.

The quantized blocks of N×N cosine coefficients output by the quantizer 412 are provided to the N×N matrix enlarger 414. The matrix enlarger 414 converts the N×N blocks of quantized coefficients into 8×8 blocks by padding each N×N block with zero coefficients. For example, the matrix enlarger 414 pads a 2×2 block of coefficients by adding six zero coefficients along each axis of the block.

The matrix enlarger 414 provides the 8×8 blocks of quantized cosine coefficients to the Huffman encoder 416. The Huffman encoder 416 uses values stored in a Huffman table 122 to compress each 8×8 block of quantized coefficients using the Huffman encoding algorithm. The Huffman encoded quantized coefficients and the Huffman table are stored in the JPEG image 118. Other types of entropy encoders, such as an arithmetic encoder, may be used instead of the Huffman encoder 416. A more complete explanation of the functions performed by various types of entropy encoders, including Huffman and arithmetic encoders, as well as the quantizer 412 and general information about the JPEG standard, is found in William B. Pennebaker and Joan L. Mitchell, *JPEG Still Image Data Compression Standard*, Van Nostrand Reinhold, 1993, which is hereby incorporated by reference herein.

FIG. 5 illustrates a block diagram of the functional units of a JPEG decoder 500 for decompressing a JPEG image to a lower resolution output image. Shown are a JPEG image 500, a Huffman decoder 511, an N×N matrix reducer 512, a dequantizer 514, an N-point scaled inverse DCT (IDCT) unit 516, and a reduced resolution output image 518. The Huffman decoder utilizes Huffman tables 522 while the dequantizer 514 utilizes modified quantization tables 520.

The Huffman decoder 511 receives and decompresses the JPEG image 510. The Huffman decoder 522 extracts the Huffman table 522 from the JPEG image 510. Using this table 522, the Huffman decoder 511 decodes the JPEG image and produces 8×8 blocks of quantized discrete cosine coefficients therefrom.

The 8×8 blocks of quantized discrete cosine coefficients are received by the N×N matrix reducer 512. The matrix reducer 512 reduces the 8×8 blocks to N×N blocks by discarding the appropriate number of higher frequency coefficients from the 8×8 blocks. Setting N to 1, 2, 3, 4, or 6 produces output images that are respectively reduced to 12.5%, 25%, 37.5%, 50%, and 75% of the original image resolution.

The N×N blocks produced by the matrix reducer 512 are received by the dequantizer 514. In addition, the dequantizer 514 retrieves from the JPEG image 510 the unmodified 8×8 quantization tables 520 that were stored when the image 510 was created. Then, the unmodified 8×8 quantization tables 520 are modified to account for the reduction in size of the image and the scale factors of the scaled inverse DCT unit 516. The unmodified 8×8 quantization tables are modified in the same manner for decompression as for compression except that the following formula is used to generate $S_{ij}$:

$$S_{ij} = \frac{1}{16} D_i D_j \sec\left(\frac{i\pi}{2N}\right) \sec\left(\frac{j\pi}{2N}\right)$$

$$\text{where } D_k = \begin{cases} \sqrt{2} & \text{if } k = 0 \\ 1 & \text{if } k \neq 0. \end{cases}$$

The dequantizer 514 uses the modified N×N quantization tables to dequantize the N×N blocks of quantized coefficients and produce N×N blocks of scaled cosine coefficients.

The IDCT unit 516 receives the N×N blocks of scaled cosine coefficients. The IDCT unit 516 performs scaled N-point IDCTs on the scaled cosine coefficients. For each received N×N block of scaled cosine coefficients, the IDCT unit 516 produces an N×N block of the reduced output image. The operation of the IDCT unit 516 is discussed in more detail below with respect to FIGS. 6–13.

As discussed above, the JPEG encoder and decoder 400,500 use DCT 410 and IDCT 516 units that respectively perform forward and inverse N-point scaled DCTs, where N is selected from 1, 2, 3, 4, and 6. The forward DCT unit 410 operates on N×N blocks of data from the source image 110, while the inverse DCT unit 516 operates on N×N blocks of scaled cosine coefficients. Both DCT units 410, 516 perform two-dimensional DCTs on each N×N block by performing N one-dimensional DCTs along the rows followed by N one-dimensional DCTs along the columns. Thus, each DCT unit 410,516 performs 2*N one-dimensional cosine transforms on each N×N block.

Because computing a DCT is computationally expensive, it is important to keep the number of mathematical operations required to perform each forward and inverse DCT to a minimum. To this end, the JPEG encoder 400 and decoder 500 respectively use fast techniques for 1-, 2-, 3-, 4-, and 6-point forward and inverse one-dimensional scaled DCTs.

The 1-point one-dimensional scaled DCT performed by the JPEG encoder 400 is given by the equation:

$$P_0 = C_0.$$

In this equation and the following equations, $P_n$ are the image points, and $C_n$ are the scaled cosine coefficients.

Figure 6:
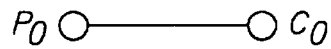
FIG. 6 is a flow graph representing a 1-point one-dimensional scaled discrete cosine transform.

FIG. 6 is a flow graph representing the 1-point one-dimensional scaled DCT. In FIG. 6 and the other flow graphs illustrated herein, a solid line indicates that the value of the node on the left of the line is added to that on the right. A dashed line indicates that the value of the node on the left is subtracted from that on the right. A solid node indicates that an addition is performed at that node. In addition, a "<<" symbol indicates a left shift operation and a ">>" indicates a right shift operation. Also, a boxed "$a_n$" symbol indicates that the value of the node to the left of the box is multiplied by $a_n$.

The 1-point one-dimensional scaled IDCT is given by the equation:

$$C_0 = P_0.$$

Figure 7:
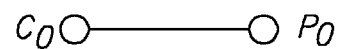
FIG. 7 is a flow graph representing a 1-point one-dimensional scaled inverse discrete cosine transform.

FIG. 7 illustrates the flow graph corresponding to the 1-point one-dimensional scaled IDCT. As can be seen from the above equations, both the forward and inverse DCT do not require any additions or multiplications.

The 2-point one-dimensional scaled DCT performed by the JPEG encoder 400 is given by the equations:

$$C_0 = P_0 + P_1; \text{ and}$$

$$C_1 = P_0 - P_1.$$

Figure 8:
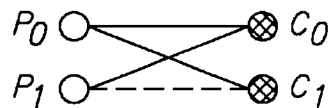
FIG. 8 is a flow graph representing a 2-point one-dimensional scaled discrete cosine transform.

FIG. 8 is a flow graph representing the 2-point one-dimensional scaled DCT.

The 2-point one-dimensional scaled IDCT is given by the equations:

$$P_0 = C_0 + C_1; \text{ and}$$

$$P_1 = C_0 - C_1.$$

Figure 9:
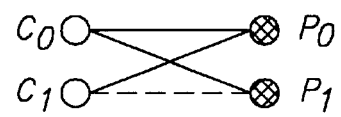
FIG. 9 is a flow graph representing a 2-point one-dimensional scaled inverse discrete cosine transform.

FIG. 9 illustrates the flow graph corresponding to the 2-point one-dimensional scaled IDCT. As can be seen from the above equations, both the forward and inverse 2-point one-dimensional scaled DCTs require two additions and no multiplication.

Figure 10:
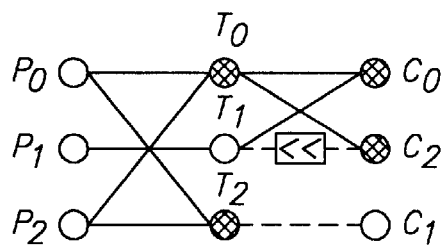
FIG. 10 is a flow graph representing a 3-point one-dimensional scaled discrete cosine transform.

The 3-point one-dimensional scaled DCT is performed in a two step process. In the first step, temporary values, $T_n$, are computed. Then, in step 2, the values of the coefficients are determined from the temporary values. Table 3 illustrates the steps for performing a 3-point one-dimensional scaled DCT and FIG. 10 illustrates the corresponding flow graph.

TABLE 3

| Step 1 | Step 2 |
|---|---|
| $T_0 = P_0 + P_2$ | $C_0 = T_0 + T_1$ |
| $T_1 = P_1$ | $C_1 = T_2$ |
| $T_2 = P_0 - P_2$ | $C_2 = T_0 - T_1 << 1$ |

Figure 11:
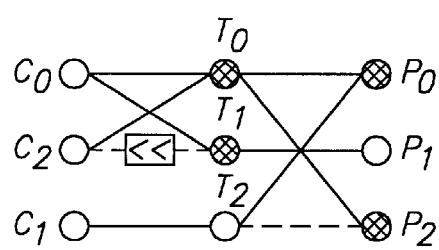
FIG. 11 is a flow graph representing a 3-point one-dimensional scaled inverse discrete cosine transform.

The 3-point one-dimensional scaled IDCT is also performed as a two step process. Table 4 illustrates the steps for performing a 3-point one-dimensional scaled IDCT and FIG. 11 illustrates the corresponding flow graph.

TABLE 4

| Step 1 | Step 2 |
|---|---|
| $T_0 = C_0 + C_2$ | $P_0 = T0 + T_2$ |
| $T_1 = C_0 - C_2 << 1$ | $P_1 = T_1$ |
| $T_2 = C_1$ | $P_2 = T_0 - T_2$ |

As can be seen from Tables 3–4, both the forward and inverse scaled 3-point DCTs require one shift operation and four additions.

Figure 12:
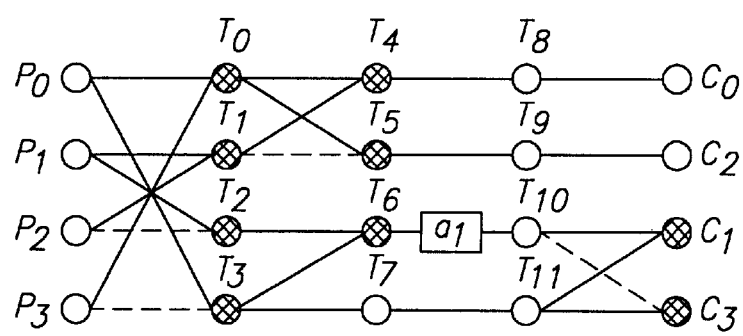
FIG. 12 is a flow graph representing a 4-point one-dimensional scaled discrete cosine transform.

The 4-point one-dimensional scaled DCT is performed as a four step process. Table 5 illustrates the steps for performing a 4-point one-dimensional scaled DCT and FIG. 12 illustrates the corresponding flow graph. The value $a_1$ is 0.3827.

TABLE 5

| Step 1 | Step 2 | Step 3 | Step 4 |
|---|---|---|---|
| $T_0 = P_0 + P_3$ | $T_4 = T_0 + T_1$ | $T_8 = T_4$ | $C_0 = T_8$ |
| $T_1 = P_1 + P_2$ | $T_5 = T_0 - T_1$ | $T_9 = T_5$ | $C_2 = T_9$ |
| $T_2 = P_1 - P_2$ | $T_6 = T_2 + T_3$ | $T_{10} = a_1 T_6$ | $C_1 = T_{10} + T_{11}$ |
| $T_3 = P_0 - P_3$ | $T_7 = T_3$ | $T_{11} = T_7$ | $C_3 = T_{11} - T_{10}$ |

Figure 13:
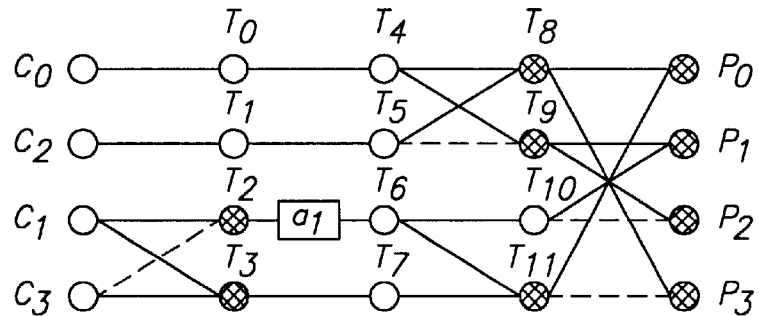
FIG. 13 is a flow graph representing a 4-point one-dimensional scaled inverse discrete cosine transform.

The 4-point one-dimensional scaled IDCT is also a four step process. Table 6 illustrates the steps for performing a 4-point one-dimensional scaled IDCT and FIG. 13 illustrates the corresponding flow graph.

TABLE 6

| Step 1 | Step 2 | Step 3 | Step 4 |
|---|---|---|---|
| $T_0 = C_0$ | $T_4 = T_0$ | $T_8 = T_4 + T_5$ | $P_0 = T_8 + T_{11}$ |
| $T_1 = C_2$ | $T_5 = T_1$ | $T_9 = T_4 - T_5$ | $P_1 = T_9 + T_{10}$ |
| $T_2 = C_1 - C_3$ | $T_6 = a_1 T_2$ | $T_{10} = T_6$ | $P_2 = T_9 - T_{10}$ |
| $T_3 = C_1 + C_3$ | $T_7 = T_3$ | $T_{11} = T_6 + T_7$ | $P_3 = T_8 - T_{11}$ |

As can be seen from Tables 5–6, both the forward and inverse 4-point one dimensional DCTs require one multiplication and nine additions.

Figure 14:
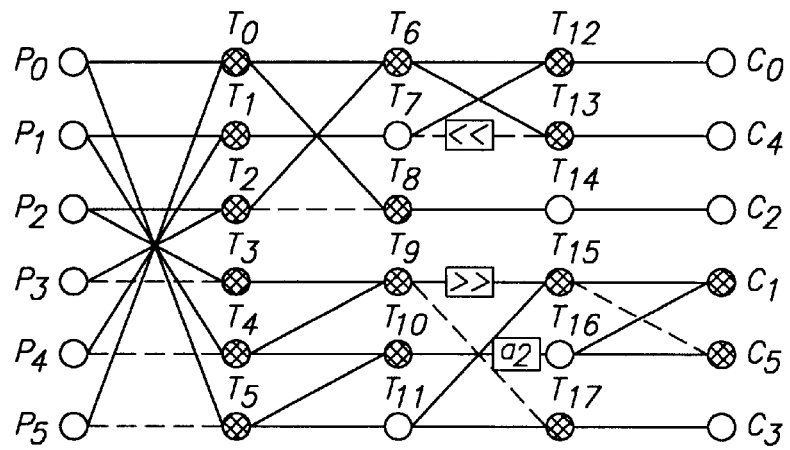
FIG. 14 is a flow graph representing a 6-point one-dimensional scaled discrete cosine transform.

The 6-point one-dimensional scaled DCT is also performed in a four step process. Table 7 illustrates the steps for performing a 6-point one-dimensional scaled DCT and FIG. 14 illustrates the corresponding flow graph. The value of $a_2$ is 0.2222.

TABLE 7

| Step 1 | Step 2 | Step 3 | Step 4 |
|---|---|---|---|
| $T_0 = P_0 + P_5$ | $T_6 = T_0 + T_3$ | $T_{12} = T_6 + T_7$ | $C0 = T_{12}$ |
| $T_1 = P_1 + P_4$ | $T_7 = T_1$ | $T_{13} = T_6 - T_7 << 1$ | $C_4 = T_{13}$ |
| $T_2 = P_2 + P_3$ | $T_8 = T_0 - T_3$ | $T_{14} = T_8$ | $C_2 = T_{14}$ |
| $T_3 = P_2 - P_3$ | $T_9 = T_3 + T_4$ | $T_{15} = T_9 >> 1 + T_{11}$ | $C_1 = T_{15} + T_{16}$ |

TABLE 7-continued

| Step 1 | Step 2 | Step 3 | Step 4 |
|---|---|---|---|
| $T_4 = P_1 - P_4$ | $T_{10} = T_4 + T_5$ | $T_{16} = a_2 T_{10}$ | $C_5 = T_{16} - T_{15}$ |
| $T_5 = P_0 - P_5$ | $T_{11} = T_5$ | $T_{17} = T_{11} - T_9$ | $C_3 = T_{17}$ |

Figure 15:
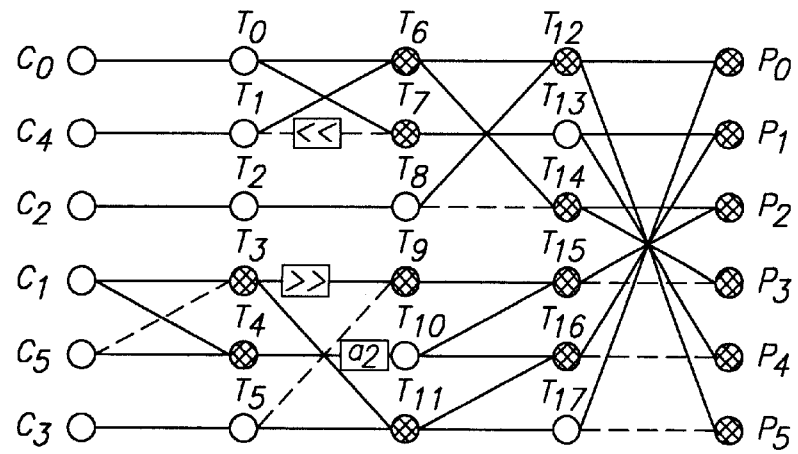
FIG. 15 is a flow graph representing a 6-point one-dimensional scaled inverse discrete cosine transform.

The 6-point one-dimensional scaled IDCT is also a four step process. Table 8 illustrates the steps for performing a 6-point one-dimensional scaled IDCT and FIG. 15 illustrates the corresponding flow graph.

TABLE 8

| Step 1 | Step 2 | Step 3 | Step 4 |
|---|---|---|---|
| $T_0 = C_0$ | $T_6 = T_0 + T_1$ | $T_{12} = T_6 + T_8$ | $P_0 = T_{12} + T_{17}$ |
| $T_1 = C_4$ | $T_7 = T_0 - T_1 << 1$ | $T_{13} = T_7$ | $P_1 = T_{13} + T_{16}$ |
| $T_2 = C_2$ | $T_8 = T_2$ | $T_{14} = T_6 - T_8$ | $P_2 = T_{14} + T_{15}$ |
| $T_3 = C_1 - C_5$ | $T_9 = T_3 >> 1 - T_5$ | $T_{15} = T_9 + T_{10}$ | $P_3 = T_{14} - T_{15}$ |
| $T_4 = C_1 + C_5$ | $T_{10} = a_2 T_4$ | $T_{16} = T_{10} + T_{11}$ | $P_4 = T_{13} - T_{16}$ |
| $T_5 = C_3$ | $T_{11} = T_3 + T_5$ | $T_{17} = T_{11}$ | $P_5 = T_{12} - T_{17}$ |

As can be seen from Tables 7–8, the forward and inverse 6-point DCTs require one multiplication, two shift operations, and 16 additions.

The system and method described above can be applied to any domain in which DCTs or IDCTs are utilized. For example, the system and method can be used to expand or compress the resolutions of images stored using the Motion Pictures Expert Group (MPEG) standard.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method of compressing a source image stored in a memory of a computer system to a higher resolution output image, the method comprising the steps of:

retrieving the source image from the memory;

performing an N-point scaled discrete cosine transform on the source image to produce scaled cosine coefficients;

quantizing the scaled cosine coefficients using values from at least one quantization table to produce scaled and quantized cosine coefficients;

enlarging the scaled and quantized cosine coefficients to produce enlarged scaled and quantized coefficients; and entropy encoding the enlarged scaled and quantized coefficients;

where N is selected from 1, 2, 3, 4, and 6.

2. The method of claim 1, where the enlarging step comprises the substep of:

padding the scaled and quantized cosine coefficients with additional coefficients.

3. The method of claim 2, where the additional coefficients comprise coefficients having a value of zero.

4. The method of claim 1, where the scaled and quantized coefficients are organized in N×N blocks and the enlarging step pads each N×N block of scaled and quantized cosine coefficients with $(8-N)^2$ additional coefficients.

5. The method of claim 1, where the step of performing an N-point scaled discrete cosine transform comprises the substep of:

partitioning the source image into N×N blocks, where the N-point scaled discrete cosine transform is performed on each N×N block.

6. The method of claim 1, further comprising the step of:

modifying the at least one quantization table to account for a scale factor in the N-point scaled discrete cosine transform.

7. The method of claim 6, wherein the modifying step comprises the substep of:

multiplying each element of the quantization tables by $S_{ij}$, where $$S_{ij} = \frac{4}{N^2} D_i D_j \sec\left(\frac{i\pi}{2N}\right) \sec\left(\frac{j\pi}{2N}\right)$$

$$\text{where } D_2 = \begin{cases} \sqrt{2} \text{ if } k = 0 \\ 1 \text{ if } k \neq 0. \end{cases}$$

8. The method of claim 1, where computer instructions for performing the method steps are stored on a computer-readable medium.

9. A method of performing an N-point scaled discrete cosine transform on an N×N block of data stored in a memory of a computer system having a processor, where N is selected from 1, 2, 3, 4, and 6, the method comprising the steps of:

retrieving the N×N block of data from the memory;

performing the N-point discrete cosine transform on the N×N block of data using the processor to produce transformed data;

entropy encoding the transformed data to produce encoded data; and storing the encoded data in the memory.

10. The method of claim 9, where N is 1, $P_i$ are data from the N×N block of data, $C_j$ are scaled coefficients, and where the performing step comprises the substep of:

calculating a scaled coefficient using $C_0 = P_0$.

11. The method of claim 9, where N is 2, $P_i$ are data from the N×N block of data, $C_j$ are scaled coefficients, and where the performing step comprises the substeps of:

calculating a first scaled coefficient using $C_0 = P_0 + P_1$; and calculating a second scaled coefficient using $C_1 = P_0 - P_1$.

12. The method of claim 9, where N is 3, $P_i$ are data from the N×N block of data, $C_j$ are scaled coefficients, $T_k$ are temporary variables, and where the performing step comprises the substeps of:

calculating temporary variables using:

$T_0 = P_0 + P_2$;

$T_1 = P_1$; and $T_2 = P_0 - P_2$; and calculating coefficients using:

$C_0 = T_0 + T_1$;

$C_1 = T_2$; and $C_2 = T_0 - T_1 << 1$.

13. The method of claim 9, where N is 4, $P_i$ are data from the N×N block of data, $C_j$ are scaled coefficients, $T_k$ are temporary variables, and where the performing step comprises the substeps of:

calculating a first set of temporary variables using:

$T_0 = P_0 + P_3$;

$T_1 = P_1 + P_2$;

$T_2=P_1-P_2$; and $T_3=P_0-P_3$;

calculating a second set of temporary variables using:

$T_4=T_0+T_1$;

$T_5=T_0+T_1$;

$T_6=T_2+T_3$; and $T_7=T_3$;

calculating a third set of temporary variables using:

$T_8=T_4$;

$T_9=T_5$;

$T_{10}=a_1T_6$, where $a_1=0.38$; and $T_{11}=T_7$; and calculating coefficients using:

$C_0=T_8$;

$C_2=T_9$;

$C_1=T_{10}+T_{11}$; and $C_3=T_{11}-T_{10}$.

14. The method of claim 9, where N is 6, $P_i$, are data from the N×N block of data, $C_j$ are scaled coefficients, $T_k$ are temporary variables, and where the performing step comprises the substeps of:

calculating a first set of temporary variables using:

$T_0=P_0+P_5$;

$T_1=P_1+P_4$;

$T_2=P_2+P_3$;

$T_3=P_2-P_3$;

$T_4=P_1-P_4$; and $T_5=P_0-P_5$;

calculating a second set of temporary variables using:

$T_6=T_0+T_3$;

$T_7=T_1$;

$T_8=T_0-T_3$;

$T_9=T_3+T_4$;

$T_{10}=T_4+T_5$; and $T_{11}=T_5$;

calculating a third set of temporary variables using:

$T_{12}=T_6+T_7$;

$T_{13}=T_6-T_7<<1$;

$T_{14}=T_8$;

$T_{15}=T_9<<1+T_{11}$;

$T_{16}=a_2T_{10}$, where $a2=0.22$; and $T_{17}=T_{11}-T_9$; and calculating coefficients using:

$C_0=T_{12}$;

$C_4=T_{13}$;

$C_2=T_{14}$;

$C_1=T_{15}+T_{16}$;

$C_5=T_{16}-T_{15}$; and $C_3=T_{17}$.

15. The method of claim 9, where computer instructions for performing the method steps are stored on a computer-readable medium.

16. A method of performing an N-point scaled inverse discrete cosine transform on an N×N block of coefficients stored in a memory of a computer system having a processor, where N is selected from 1, 2, 3, 4, and 6, the method comprising the steps of:

entropy decoding the N×N block of coefficients in the memory to produce a decoded N×N block of coefficients;

performing the N-point scaled inverse discrete cosine transform on the decoded N×N block of coefficients using the processor to produce transformed data; and storing the transformed data in the memory.

17. The method of claim 16, where N is 1, $P_i$ are data from the transformed data, $C_j$ are coefficients from the N×N block of coefficients retrieved from the memory, and the performing step comprises the substep of:

calculating a datum using $P_0=C_0$.

18. The method of claim 16, where N is 2, $P_i$ are data from the transformed data, $C_j$ are coefficients from the N×N block of coefficients retrieved from the memory, and the performing step comprises the substeps of:

calculating a first datum using $P_0=C_0+C_1$; and calculating a second datum using $P_1=C_0-C_1$.

19. The method of claim 16, where N is 3, $P_i$ are data from the transformed data, $C_j$ are coefficients from the N×N block of coefficients retrieved from the memory, $T_k$ are temporary variables, and the performing step comprises the substeps of:

calculating a first set of temporary variables using:

$T_0=C_0+C_2$;

$T=C_0-C_0<<1$; and $T_2=C_1$; and calculating a set of data using:

$P_0=T_0+T_2$;

$P_1=T_1$; and $P_2=T_0-T_2$.

20. The method of claim 16, where N=4, $P_i$ are data from the transformed data, $C_j$ are coefficients from the N×N block of coefficients retrieved from the memory, $T_k$ are temporary variables, and the performing step comprises the substeps of:

calculating a first set of temporary variables using:

$T_0=C_0;$ $T_1=C_2;$ $T_2=C_1-C_3;$ and $T_3=C_1+C_3;$ calculating a second set of temporary variables using:

$T_4=T_0;$ $T_5=T_1;$ $T_6=a_1T_2$, where $a_1=0.38;$ and $T_7=T_3;$ calculating a third set of temporary variables using:

$T_8=T_4+T_5;$ $T_9=T_4-T_5;$ $T_{10}=T_6;$ and $T_{11}=T_6+T_7;$ and calculating a set of data using:

$P_0=T_8+T_{11};$ $P_1=T_9+T_{10};$ $P_2=T_9-T_{10};$ and $P_3=T_8-T_{11}.$

21. The method of claim 16, where $N=6, P_i$ are data from the transformed data, $C_j$ are coefficients from the N×N block of coefficients retrieved from the memory, $T_k$ are temporary variables, and the performing step comprises the substeps of:

calculating a first set of temporary variables using:

$T_0=C_0;$ $T_1=C_4;$ $T_2=C_2;$ $T_3=C_1-C_5;$ $T_4=C_1+C_5;$ and $T_5=C_3;$ calculating a second set of temporary variables using:

$T_6=T_0+T_1;$ $T_7=T_0-T_1<<1;$ $T_8=T_2;$ $T_9=T_3<<1-T_5;$ $T_{10}=a_2T_4$, where $a_2=0.22;$ and $T_{11}=T_3+T_5;$ calculating a third set of temporary variables using:

$T_{12}=T_6+T_8;$ $T_{13}=T_7;$ $T_{14}=T_6-T_8;$ $T_{15}=T_9+T_{10};$ $T_{16}=T_{10}+T_{11};$ and $T_{17}=T_{11};$ and calculating a set of data using:

$P_0=T_{12}+T_{17};$ $P_1=T_{13}+T_{16};$ $P_2=T_{14}+T_{15};$ $P_3=T_{14}-T_{15};$ $P_4=T_{13}-T_{16};$ and $P_5=T_{12}-T_{17}.$ 22. The method of claim 16, where computer instructions for performing the method steps are stored on a computer-readable medium.

23. A method of decompressing blocks of quantized cosine coefficients stored in a memory of a computer system to a lower resolution output image, the method comprising the steps of:

retrieving a two-dimensional block of the quantized cosine coefficients image from the memory;

reducing the block to an N×N block;

retrieving a quantization table from the image;

modifying the quantization table;

dequantizing the N×N block with the quantization table to produce a dequantized N×N block;

performing an N-point scaled inverse discrete cosine transform on the N×N block to produce an output image block; and storing the output image block to the memory;

where N is selected from 1, 2, 3, 4, and 6.

24. The method of claim 23, wherein the modifying step comprises the substep of:

multiplying each element of the quantization table by $S_{ij}$, where $$S_{ij} = \frac{1}{16} D_i D_j \sec\left(\frac{i\pi}{2N}\right) \sec\left(\frac{j\pi}{2N}\right)$$

$$\text{where } D_k = \begin{cases} \sqrt{2} & \text{if } k = 0 \\ 1 & \text{if } k \neq 0. \end{cases}$$

25. The method of claim 23, wherein the blocks of quantized cosine coefficients stored in the memory are entropy encoded and further comprising the step of:

entropy decoding the two-dimensional retrieved block of quantized cosine coefficients to produce a block of decoded quantized cosine coefficients, where the reducing step reduces the block of decoded quantized cosine coefficients.

26. The method of claim 23, where the reducing step comprises the substep of:

discarding higher order elements of the block.

27. The method of claim 26, where the discarding step comprises the substep of:

processing the block with an N×N reduction matrix.

28. The method of claim 26, where the block has Y×Y data elements where Y is at least 8 and where the discarding step discards $(Y-N)^2$ high frequency elements.

29. The method of claim 23, where computer instructions for performing the method steps are stored on a computer-readable medium.

30. An image scaling system for compressing a source image to a higher resolution output image, the system comprising:

a discrete cosine transform unit performing N-point scaled discrete cosine transforms on N×N blocks of the source image to produce scaled cosine coefficients;

a quantizer quantizing the scaled cosine coefficients to produce scaled and quantized cosine coefficients;

a matrix enlarger enlarging the scaled and quantized cosine coefficients to produce enlarged scaled and quantized cosine coefficients; and entropy encoding the enlarged scaled and quantized cosine coefficients;

where N is selected from 1, 2, 3, 4, and 6.

31. The system of claim 30, wherein the matrix enlarger pads the scaled and quantized cosine coefficients with additional coefficients.

32. The system of claim 31, wherein the additional coefficients have values of zero.

33. The system of claim 30, further comprising:

at least one quantization table used by the quantizer to quantize the scaled cosine coefficients;

where the quantization table is modified to account for a scale factor in the N-point scaled discrete cosine transform.

34. An image scaling system for decompressing blocks of quantized cosine coefficients image to a lower resolution output image, the system comprising:

a matrix reducer for reducing a block of the quantized cosine coefficients to an N×N block of quantized cosine coefficients;

a dequantizer for extracting at least one quantization table from the encoded source image, modifying the at least one quantization table to account for a scale factor, and dequantizing the N×N block of quantized cosine coefficients to an N×N block of scaled cosine coefficients; and a inverse discrete cosine transform unit for performing an inverse discrete cosine transform on the N×N block of scaled cosine coefficients to produce an output image block;

where N is selected from 1, 2, 3, 4, and 6.

35. A method for compressing an image comprising the steps of:

generating a source image;

dividing the source image into a plurality of blocks, each block comprising N×N pixels;

frequency transforming each of the plurality of blocks to produce N×N frequency coefficients for each transformed block;

combining a predetermined number of additional coefficients with the N×N frequency coefficients to produce M×M frequency coefficients; and entropy encoding the M×M frequency coefficients.

36. An image compressing apparatus comprising:

generation means for generating a source image;

division means for dividing the source image into a plurality of blocks, each block comprising N×N pixels;

first production means for frequency transforming each of the plurality of blocks to produce N×N frequency coefficients for each transformed block;

second production means for combining a predetermined number of additional coefficients with the N×N frequency coefficients to produce M×M frequency coefficients; and entropy encoding means for entropy encoding the M×M frequency coefficients.

* * * * *